United States Patent
Ohyama et al.

(10) Patent No.: US 8,137,839 B2
(45) Date of Patent: Mar. 20, 2012

(54) ALLOY POWDER FOR ELECTRODE AND METHOD FOR PRODUCING SAME

(75) Inventors: Hideaki Ohyama, Osaka (JP); Kyoko Nakatsuji, Osaka (JP); Yoshitaka Dansui, Osaka (JP); Shinichi Orimo, Miyagi (JP); Yuko Nakamori, Miyagi (JP); Hai-Wen Li, Miyagi (JP); Kazutaka Ikeda, Miyagi (JP)

(73) Assignee: Panasonic Corporation, Osaka (JP)

( * ) Notice: Subject to any disclaimer, the term of this patent is extended or adjusted under 35 U.S.C. 154(b) by 992 days.

(21) Appl. No.: 12/063,015

(22) PCT Filed: Sep. 14, 2006

(86) PCT No.: PCT/JP2006/318292
§ 371 (c)(1),
(2), (4) Date: Feb. 5, 2008

(87) PCT Pub. No.: WO2007/034737
PCT Pub. Date: Mar. 29, 2007

(65) Prior Publication Data
US 2010/0221608 A1 Sep. 2, 2010

(30) Foreign Application Priority Data
Sep. 26, 2005 (JP) .................. 2005-277319

(51) Int. Cl.
*H01M 4/58* (2010.01)
*C22C 19/03* (2006.01)
*B22F 9/16* (2006.01)

(52) U.S. Cl. .......... 429/218.2; 429/218.1; 429/223
(58) Field of Classification Search .......... 429/209, 429/218.1–218.2, 223–224; 420/441–460, 420/580–589, 900; 502/300–355; 428/357, 428/402–403; 75/288, 245–248, 255; 252/62.51, 252/62.55–62.62
See application file for complete search history.

(56) References Cited

U.S. PATENT DOCUMENTS

| 6,329,101 B1 * | 12/2001 | Kawakami .......... 429/218.2 |
| 2002/0051908 A1 | 5/2002 | Ebihara |
| 2002/0122982 A1 | 9/2002 | Okada |
| 2007/0269717 A1 * | 11/2007 | Bandou et al. .......... 429/218.2 |

FOREIGN PATENT DOCUMENTS

| JP | 7-099055 | 4/1995 |
| JP | 8-67936 | 3/1996 |

(Continued)

OTHER PUBLICATIONS
International Search Report dated Dec. 5, 2006.

(Continued)

*Primary Examiner* — Basia Ridley
*Assistant Examiner* — Jacob Buchanan
(74) *Attorney, Agent, or Firm* — Dickinson Wright PLLC (57) ABSTRACT

An electrode alloy powder includes a hydrogen storage alloy and magnetic material clusters. The hydrogen storage alloy contains 20 to 70 wt % of Ni. The magnetic material clusters contain metal nickel, and have an average cluster size of 8 to 10 nm. A method for producing the electrode alloy powder includes an activation step of allowing a raw material powder including a hydrogen storage alloy to be in contact with an aqueous solution containing A wt % of sodium hydroxide and held at 100° C. or greater for B minutes. A and B satisfy $2410 \leq A \times B \leq 2800$.

7 Claims, 4 Drawing Sheets

FOREIGN PATENT DOCUMENTS

| | | |
|---|---|---|
| JP | 11-503872 | 3/1999 |
| JP | 11-154511 | 6/1999 |
| JP | 2 988 479 | 12/1999 |
| JP | 2002-80905 | 3/2002 |
| JP | 2002-256301 | 9/2002 |
| WO | 96/33518 | 10/1996 |
| WO | WO 2006022168 A1 * | 3/2006 |

OTHER PUBLICATIONS

M. Ayari et al., "Magnetic Properties of $LaNi_{3.55}Mn_{0.4}Al_{0.3}Co_{0.75-x}Fe_x$ (x=0, 0.35) compounds before and after electrochemical cycles," Jopurnal of Magnetism and Magnetic Materials, vols. 242-245, Part II, Apr. 2002, pp. 850-853.

* cited by examiner

ALLOY POWDER FOR ELECTRODE AND METHOD FOR PRODUCING SAME

TECHNICAL FIELD

The present invention relates to an electrode alloy powder containing a hydrogen storage alloy, and more particularly to improved magnetic material clusters contained in the electrode alloy powder. The electrode alloy powder of the present invention is used in a negative electrode of an alkaline storage battery or the like.

BACKGROUND ART

Hydrogen storage alloys possess the ability to reversibly absorb and desorb hydrogen during charge and discharge. A hydrogen storage alloy has a theoretical capacity density larger than that of cadmium, and unlike zinc electrodes, dendrites are not formed. For this reason, hydrogen storage alloys are considered as a promising material for negative electrodes of alkaline storage batteries.

In recent years, nickel-metal hydride storage batteries containing a hydrogen storage alloy are attracting attention also as power sources for driving electric vehicles or the like. For this reason, demand for nickel-metal hydride storage batteries having improved output characteristics and storage characteristics is growing.

For the negative electrodes of nickel-metal hydride storage batteries, hydrogen storage alloys having a $CaCu_5$ type crystal structure are mainly used. For example, $MmNi_5$ (where Mm represents a mixture of rare-earth elements) alloys, in which Ni is partially replaced by Co, Mn, Al, Cu or the like, are widely used.

A produced hydrogen storage alloy is subjected to an activation step, and then is used as an electrode alloy powder. Accordingly, many proposals are made regarding the activation step. One is, for example, an activation step in which hydrogen storage alloy powders containing nickel are immersed in an aqueous solution containing 30 to 80 wt % of sodium hydroxide and held at 90° C. or greater (see Patent Document 1).

Patent Document 1: Japanese Laid-Open Patent Publication No. 2002-256301

DISCLOSURE OF THE INVENTION

Problem to be Solved by the Invention

According to Patent Document 1, it is possible to efficiently obtain an electrode alloy powder that includes a magnetic material containing metal nickel in an amount of 3 to 9 wt %, is highly conductive, is unlikely to undergo corrosion in alkaline electrolytes, and exhibits excellent electrode activity in initial charge/discharge cycles. However, the electrode activity is considered to depend largely not only on the content of the magnetic material containing metal nickel, but also on the size of the clusters of the magnetic material.

Means for Solving the Problem

The present invention proposes to control the average cluster size of magnetic material clusters so as to significantly suppress a reduction in the electrode activity that occurs due to the repetition of charge and discharge.

More specifically, the present invention proposes an electrode alloy powder including a hydrogen storage alloy and magnetic material clusters, wherein the hydrogen storage alloy contains 20 to 70 wt % of Ni, the magnetic material clusters contain metal nickel, and the magnetic material clusters have an average cluster size of 8 to 10 nm.

It is preferable that the content of the magnetic material clusters in the electrode alloy powder is 2.8 to 4.2 wt %.

The hydrogen storage alloy has, but is not limited to, for example, a $CaCu_5$ type crystal structure. When the hydrogen storage alloy has a $CaCu_5$ type crystal structure, it is preferable that the hydrogen storage alloy further contains Co, Mn, Al and a mixture of rare-earth elements. It is also preferable that the Co content in the hydrogen storage alloy is 6 wt % or less.

The present invention further relates to an alkaline storage battery (nickel-metal hydride storage battery) including a negative electrode containing the above-described electrode alloy powder.

The present invention further relates to a method for producing an electrode alloy powder including an activation step of allowing a raw material powder including a hydrogen storage alloy to be in contact with an aqueous solution containing A wt % of sodium hydroxide and held at 100° C. or greater for B minutes, wherein the hydrogen storage alloy contains 20 to 70 wt % of Ni, and A and B satisfy $2410 \leq A \times B \leq 2800$.

In this case, it is preferable that the value of A satisfies $42 \leq A \leq 47$.

It is preferable that the value of B satisfies $52 \leq B \leq 59$.

It is preferable that the raw material powder has an average particle size of 5 to 30 μm.

It is preferable to perform, before performing the activation step, a step of wetting the raw material powder by mixing the raw material powder with water so that the raw material powder in a wet state is allowed to come into contact with the above-described aqueous solution of sodium hydroxide.

As the step of wetting the raw material powder by mixing it with water, for example, a step is performed in which crude particles of the hydrogen storage alloy are pulverized to an average particle size of 5 to 30 μm in the presence of water.

The alloy powder having been subjected to the activation step preferably is washed with water. It is preferable that the washing is performed until the pH of the water used for the washing reaches not greater than 9. The washed alloy powder preferably is oxidized by mixing it in water with an oxidizing agent. It is preferable that the oxidation is performed by adding an oxidizing agent to water having a pH of 7 or greater in which the alloy powder is dispersed. For example, a hydrogen peroxide solution is added to water having a pH of 7 or greater in which the alloy powder is dispersed while stirring. The amount of hydrogen peroxide to be added preferably is 0.005 to 1 part by weight per 100 parts by weight of the raw material powder.

Effect of the Invention

For the electrode alloy powder of the present invention, the average cluster size of the magnetic material clusters containing metal nickel is controlled to fall within a preferred range. Thus, the activity of the alloy powder involved in the absorption and desorption of hydrogen is retained for a long period of time. This is presumably because the catalysis of the magnetic material clusters involved in dissociation of a hydrogen molecule and bonding of hydrogen atoms is retained.

BEST MODE FOR CARRYING OUT THE INVENTION

The electrode alloy powder of the present invention includes a hydrogen storage alloy and magnetic material clusters. The hydrogen storage alloy contains 20 to 70 wt % of Ni, and the magnetic material clusters contain metal nickel. The magnetic material clusters have an average cluster size of 8 to 10 nm.

The hydrogen storage alloy with a Ni content of less than 20 wt % does not function as a hydrogen storage alloy. When the Ni content exceeds 70 wt % in the hydrogen storage alloy, the tendency for the hydrogen equilibrium pressure to increase becomes pronounced, leading to a deterioration in output of the battery.

The magnetic material clusters are produced by immersing a raw material powder including a hydrogen storage alloy in an aqueous alkaline solution. As the raw material powder, a hydrogen storage alloy powder containing 20 to 70 wt % of Ni can be used. As used herein, "magnetic material clusters" means a ferromagnetic material composed mainly of nickel in the form of a metal.

The metal nickel is deposited in the surface portion of the electrode alloy powder in a state of crystalline or amorphous aggregates. More specifically, the electrode alloy powder of the present invention has a nucleus and a surface portion. The nucleus contains the hydrogen storage alloy, and the surface portion contains the magnetic material clusters. It is preferable that the nucleus containing the hydrogen storage alloy is covered uniformly by the surface portion containing the magnetic material clusters.

It is preferable that the cluster size of the magnetic material clusters increases gradually from the inside toward the outside of the surface portion. In other words, it is preferable that the amount of magnetic material clusters having a large cluster size increases gradually from the inside toward the outside of the surface portion, and the amount of magnetic material clusters having a small cluster size decreases gradually from the inside toward the outside of the surface portion.

The magnetic material clusters having a small cluster size, particularly magnetic material clusters having a cluster size of 8 to 10 nm, function as a catalyst when the hydrogen storage alloy absorbs hydrogen. Accordingly, it is preferable that the magnetic material clusters having a small cluster size are concentrated in the proximity to the nucleus containing the hydrogen storage alloy. This makes it easy for the hydrogen storage alloy to receive and release hydrogen, whereby the hydrogen-absorbing capability and the hydrogen-desorbing capability of the electrode alloy powder is optimized.

From the above, it is preferable that the amount of the magnetic material clusters having a cluster size of 8 to 10 nm decreases gradually from the inside toward the outside of the surface portion. Although the amount of the magnetic material clusters having a cluster size of 8 to 10 nm preferably decreases monotonically from the inside toward the outside of the surface portion, the amount may only tend to decrease on average.

The cluster size of the magnetic material clusters can be measured by observing a cross section of the electrode alloy powder with a TEM (transmission electron microscope). In this process, by subjecting the cross-sectional TEM image to an image process, the cluster size distribution of the magnetic material clusters can be determined. In the image process, circles that completely surround the magnetic material clusters are defined, and the diameter of the circles is determined as the cluster size of the magnetic material clusters.

The average cluster size of the magnetic material clusters can be determined in the following manner, for example.

First, a magnetization curve of the electrode alloy powder is determined. The magnetization curve represents the relationship between the intensity of a magnetic field applied (H) and an induced magnetization (M).

The magnetization curve is determined by measuring the magnetization (M) induced in a magnetic field applied (H). The obtained magnetization (M) (emu/g), that is, the total sum of atomic magnetic moments per unit volume, is expressed by the following equation (1): $M = \Sigma\{\mu f(d) L(\alpha)\}$, where $\mu$ represents the relative magnetic permeability of nickel.

In equation (1), f(d) represents a distribution function of the diameter d of the magnetic material clusters. If the standard deviation of the diameter d is represented by $\delta$, f(d) is expressed by the following equation (2):

$$f(d) = 1/\{(2\Pi)^{1/2} \ln(\delta)\} \times \exp\{-(\ln(d)-\ln(d_m))^2/(2(\ln(\delta))^2)\},$$

where $d_m$ represents the median diameter (the most frequently occurring diameter) of d.

In equation (1), $L(\alpha)$ is a relational expression that represents the ratio between the saturation magnetization Ms and the measured magnetization $M_{Ni}$. L(a) is expressed by the following equation (3): $L(\alpha) = \coth(\alpha) - 1/\alpha$, where $\alpha = \mu H/K_B T$, $\mu = (M_{Ni} 4\Pi/3) \times (d/2)^3$, $\coth(\alpha)$ is a hyperbolic function ($\coth(\alpha) = \{(e^\alpha + e^{-\alpha})/(e^\alpha - e^{-\alpha})\}$). Herein, $\mu$ represents the relative magnetic permeability of nickel, $K_B$ represents a Boltzmann constant, T represents an absolute temperature, and $M_{Ni}$ represents the magnetization of nickel.

Equation (1) and the magnetization curve, which is measured data, are fitted, thereby yielding an experimental value $\mu$ in which the magnetization curve and equation (1) match.

If the number of the magnetic material clusters is represented by n, the value of n is expressed by the following equation (4): $n = \mu N/Ms Mmol$, where N is an Avogadro's number, Mmol is the molar weight of the magnetic material (metal nickel weight per mol), and Ms is the saturation magnetization.

The average cluster size $d_{average}$ of the magnetic material clusters is obtained by the following equation (5): $d_{average} = \Sigma\{d \times f(d)\}/n$.

A determination of the average cluster size $d_{average}$ of the magnetic material clusters is described in, for example, Reference Document 1 (Magnetic Properties of $LaNi_{3.55}Mn_{0.4}Al_{0.3}Co_{0.75-x}Fe_x$ compounds before and after electrochemical cycles, Journal of Magnetism and Magnetic Materials, Vol. 242-245 (2002), pp. 850-853), and the average cluster size can be determined uniquely by a person skilled in the art.

When the average cluster size of the magnetic material clusters is less than 8 nm, or exceeds 10 nm, the activity of the alloy powder tends to be low due to the repetition of charge and discharge. Consequently, the capacity of an electrode that contains the alloy powder decreases significantly.

It is preferable that the content of the magnetic material clusters in the electrode alloy powder is 2.8 to 4.2 wt %. When the content of the magnetic material clusters is less than 2.8 wt %, or exceeds 4.2 wt %, it may be difficult to control the average cluster size of the magnetic material clusters.

The content of the magnetic material clusters in the electrode alloy powder is determined from a saturation magnetization of the electrode alloy powder obtained in, for example, a magnetic field of 10 kOe. The magnetic material clusters may contain metal cobalt or the like, but the saturation magnetization is assumed to be completely based on the metal nickel. And, the amount of the metal nickel corresponding to the saturation magnetization is defined as the amount of the magnetic material clusters.

It is preferable that the hydrogen storage alloy has a $CaCu_5$ type (that is, $AB_5$ type) crystal structure. Particularly, a $MmNi_5$ (Mm: misch metal)-based hydrogen storage alloy is preferable. It should be noted that Mm is a mixture of rare-earth elements. Mm contains 40 to 50% of Ce and 20 to 40% of La, and further contains Pr and Nd. In the site A, other than the rare-earth elements, for example, niobium, zirconium or the like are present. In the site B, other than Ni, for example, Co, Mn, Al or the like are present. However, because Co is expensive, from the viewpoint of achieving a reduction in cost, it is preferable to suppress the Co content in the hydrogen storage alloy to 6 wt % or less.

Examples of the composition of the hydrogen storage alloy suitable for the present invention include $La_{0.8}Nb_{0.2}Ni_{2.5}Co_{2.4}Al_{0.1}$, $La_{0.8}Nb_{0.2}Zr_{0.03}Ni_{3.8}Co_{0.7}Al_{0.5}$, $MmNi_{3.65}Co_{0.75}Mn_{0.4}Al_{0.3}$, $MmNi_{2.5}Co_{0.7}Al_{0.8}$, and $Mm_{0.85}Zr_{0.15}Ni_{1.0}Al_{0.8}V_{0.2}$.

The magnetic material clusters containing metal nickel are produced through an activation step of allowing a raw material powder including a hydrogen storage alloy containing 20 to 70 wt % of Ni to come into contact with an aqueous solution of sodium hydroxide. As the raw material powder, for example, various hydrogen storage alloy powders as described above can be used. However, for controlling the average cluster size of the magnetic material clusters to fall within a preferred range, the activation step for the hydrogen storage alloy powder is required to be controlled precisely. By appropriately controlling the conditions for the activation step, the development of corrosion reaction and leach-out reaction of the hydrogen storage alloy is controlled, whereby the cluster size distribution of the magnetic material clusters will be optimized.

More specifically, the aqueous solution of sodium hydroxide used in the activation step needs to be 100° C. or greater. Further, where the concentration of sodium hydroxide in the aqueous solution of sodium hydroxide is represented by A (wt %) and the contact time during which the aqueous solution of sodium hydroxide and the raw material powder are in contact is represented by B (min.), A and B needs to satisfy $2410 \leq A \times B \leq 2800$.

In the activation step for the hydrogen storage alloy, usually, an aqueous solution of potassium hydroxide is used. With the use of an aqueous solution of potassium hydroxide, the activation of the hydrogen storage alloy proceeds rapidly in a short time. On the other hand, in the case of the aqueous solution of sodium hydroxide, the activation proceeds more slowly than in the case of using the aqueous solution of potassium hydroxide. However, if the temperature of the aqueous solution, the concentration of sodium hydroxide, and the contact time between the alloy powder and the aqueous solution are controlled appropriately, the use of the aqueous solution of sodium hydroxide provides improved performance of the electrode alloy powder. The aqueous solution of sodium hydroxide used in the present invention may further contain, in addition to NaOH, an appropriate amount (less than 0.07 mol per 1 mol of NaOH) of other alkali (KOH, LiOH, etc.).

When the value obtained by A×B is less than 2410, or exceeds 2800, the activity of the alloy powder decreases rapidly due to the repetition of charge and discharge. As a result, the capacity of an electrode containing the alloy powder decreases significantly. This is because the average cluster size of the magnetic material clusters produced through the activation step falls out of the appropriate range (less than 8 nm or above 10 nm). It is preferable that the value obtained by A×B falls within the range of $2410 \leq A \times B \leq 2550$.

When the temperature of the aqueous solution of sodium hydroxide is less than 100° C., a longer time is required for the activation, and it will also be difficult to control the cluster size of the magnetic material clusters.

It is preferable that the value of A, which represents the concentration of sodium hydroxide in the aqueous solution of sodium hydroxide, satisfies $42 \leq A \leq 47$. When the value of A is too small, a longer time will be required for the activation step, resulting in decreased productivity. Also, the production of the magnetic material clusters becomes difficult to proceed. On the other hand, when the value of A is too large, it will be difficult to control the average cluster size of the magnetic material clusters.

It is preferable that the value of B, which represents the contact time during which the raw material powder made of a hydrogen storage alloy and the aqueous solution of sodium hydroxide are in contact, satisfies $52 \leq B \leq 59$. When the value of B is too small, the production of the magnetic material clusters becomes difficult to proceed. On the other hand, when the value of B is too large, the productivity decreases, and it be difficult to control the average cluster size of the magnetic material clusters.

The average particle size of the raw material powder preferably is 5 to 30 μm. When the average particle size is less than 5 μm, the amount of hydrogen to be absorbed by the alloy powder tends to be small. On the other hand, when the average particle size exceeds 30 μm, the specific surface area decreases, so that high rate discharge characteristics tend to be low.

From the viewpoint of preventing the hydrogen storage alloy from being oxidized during the activation step and of enhancing the effect of the activation, it is preferable that the activation step is performed using a wet method throughout the step. In other words, the hydrogen storage alloy preferably is kept wet with water at all time.

For example, crude hydrogen storage alloy particles obtained by a casting process are pulverized to an average particle size of 5 to 30 μm in the presence of water. Thereafter, the hydrogen storage alloy powder that is wet with water preferably is allowed to come into contact with the aqueous solution of sodium hydroxide. Alternatively, it is also possible to pulverize the crude hydrogen storage alloy particles using a dry method, and to wet the hydrogen storage alloy by adding water thereto immediately before the activation step is performed. It is also possible to wet a hydrogen storage alloy that is obtained by an atomizing process or the like by adding water thereto immediately before the activation step is performed.

The alloy powder having been subjected to the activation step preferably is washed with water. It is preferable that the washing with water is terminated when the pH of water used for the washing reaches not greater than 9. If the washing with water is terminated when the pH of water used for the washing is still greater than 9, impurities may remain on the surface of the alloy powder. The washing with water preferably is performed while the alloy powder is stirred.

The alloy powder after the washing may have absorbed a small amount of hydrogen. Thus, from the viewpoint of removing the hydrogen to stabilize the alloy, an oxidizing agent may be added to the alloy powder. By treating the alloy powder with an oxidizing agent, the hydrogen absorbed into the alloy can be removed chemically. It is preferable that the oxidation is performed by introducing an oxidizing agent into water having a pH of 7 or greater in which the alloy powder is dispersed. As the oxidizing agent, for example, a hydrogen peroxide solution can be used. Hydrogen peroxide is preferable because even when it reacts with hydrogen, only water is produced. The amount of the oxidizing agent preferably is 0.005 to 1 part by weight per 100 parts by weight of the raw material powder. After the removal of hydrogen in the alloy, even if the alloy powder is exposed to the atmosphere, a reaction between oxygen and hydrogen hardly occurs. Accordingly, the heating of the alloy powder will be suppressed, improving safety during the production process.

Hereinafter, the present invention will be described more specifically with reference to examples, but it should be understood that the present invention is not limited to the examples given below.

Example 1

(i) Preparation of Hydrogen Storage Alloy

Simple substances of Mm, Ni, Mn, Al and Co were mixed at a predetermined ratio. The obtained mixture was melted in a high frequency melting furnace to produce a hydrogen storage alloy ingot having a composition represented by $MmNi_{4.1}Mn_{0.4}Al_{0.3}Co_{0.4}$. The ingot was heated at 1060° C. in an argon atmosphere for 10 hours. The heated ingot was pulverized into crude particles. The obtained crude particles were pulverized using a wet type ball mill in the presence of water to a size of 75 μm or smaller. Thus, a raw material powder of hydrogen storage alloy having an average particle size of 20 μm was obtained.

(ii) Activation of Alloy

The raw material powder was contacted with an aqueous solution containing A wt % of sodium hydroxide and held at a predetermined temperature (T° C.) for B minutes. As shown in Table 1, the value of A was varied in the range from 20 to 49, and the value of B was varied in the range from 35 to 130.

(iii) Washing

After the activation step, the alloy powder was washed with warm water, then dewatered and dried. The washing was performed until the pH of the used warm water reached not greater than 9. As a result, an electrode alloy powder, from which impurities were removed, was obtained.

(iv) Content of Magnetic Material Clusters

The content of the magnetic material clusters was measured using a sample vibrating magnetometer (VSM-C7-10A, a compact full automatic vibrating sample magnetometer available from Toei Industry Co., Ltd.). Specifically, saturation magnetization in a magnetic field of 10 kOe was determined for the electrode alloy powder, and the amount of metal nickel (i.e., magnetic material clusters) corresponding to the saturation magnetization was determined, and then the content of the magnetic material clusters was calculated.

(v) Average Cluster Size of Magnetic Material Clusters

Figure 1:
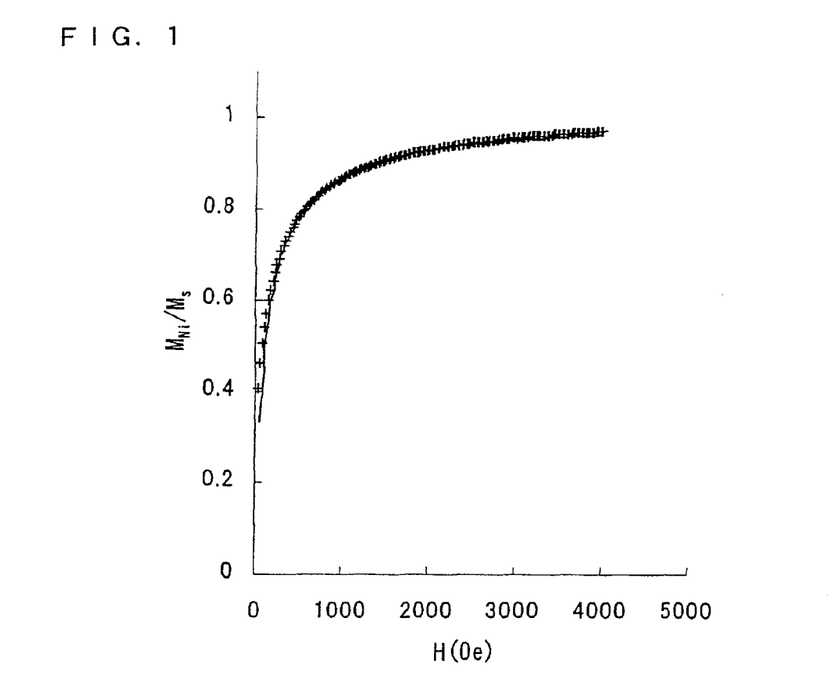
FIG. 1 is an example of a magnetization curve of an electrode alloy powder according to an example.

First, a magnetization curve was determined, which was then fitted to equation (1) given above so as to determine the value of μ. FIG. 1 shows an example of a magnetization curve obtained by fitting. The + signs represent measured values, and the solid line represents a fitting curve. The value of μ was substituted into equation (4) given above to determine the number n of the magnetic material clusters. The value of n was substituted into equation (5) given above to determine the average cluster size $d_{average}$ of the magnetic material clusters.

(vi) Observation of Cross Section of Magnetic Material Clusters

Figure 2:
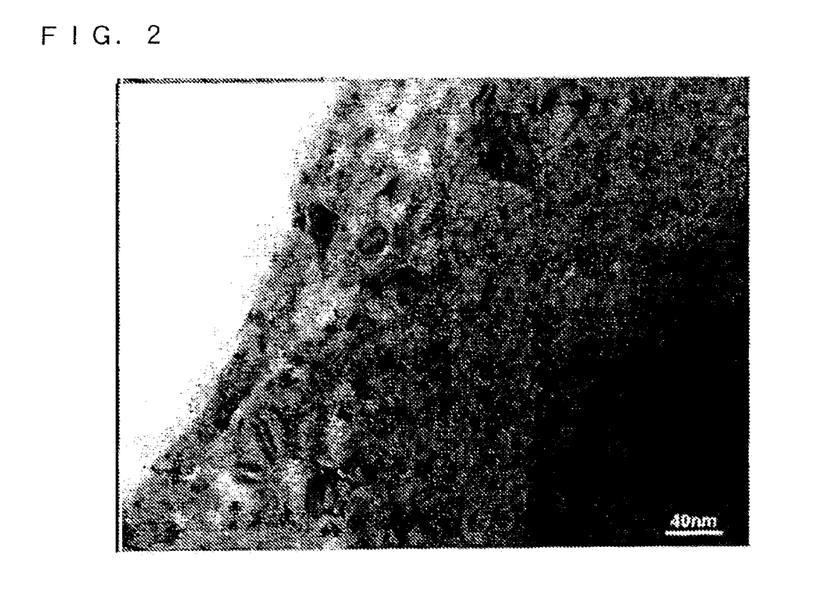
FIG. 2 is a cross-sectional TEM image of an electrode alloy powder according to an example.

The electrode alloy powder was mixed with an epoxy resin to obtain a paste. This paste was applied onto a silicon wafer, after which a similar silicon wafer was placed thereon so as to sandwich the paste with the silicon wafers. Thereafter, the resulting sandwiching member was allowed to sit for 5 hours to cure the epoxy resin. Subsequently, the sandwiching member was mechanically polished so as to obtain a cross section of the paste sandwiched by the silicon wafers. The obtained polished surface was subjected to an ion milling using PIPS691 available from GATAN Inc. to obtain a test sample. The polished surface of the obtained sample was observed using a high-resolution transmission electron microscope (H-9000UHR available from Hitachi, Ltd.). The accelerating voltage was set to 300 kV. FIG. 2 shows an example of the obtained cross-sectional TEM image (magnification: 500000).

(vii) Image Process of Cross-Sectional TEM Image

In the cross-sectional TEM image of FIG. 2, the surface portion of the electrode alloy powder was divided into three sections (A to C). In each section, regions formed of the magnetic material clusters made of metal nickel (cluster regions) and regions formed of a metal oxide (oxide regions) were observed. In the cluster regions, the crystal lattice spacing is smaller than that of the oxide regions. For this reason, in the cross-sectional TEM image, the cluster regions appeared dark, and the oxide regions appeared bright. Here, circles that surround the dark cluster regions are defined as corresponding circles to the cluster regions (hereinafter referred to as "corresponding circles"). The diameter of the corresponding circles is the maximum diameter of the magnetic material clusters. The diameter of the corresponding circles can be regarded as the cluster size of the magnetic material clusters.

Figure 3:
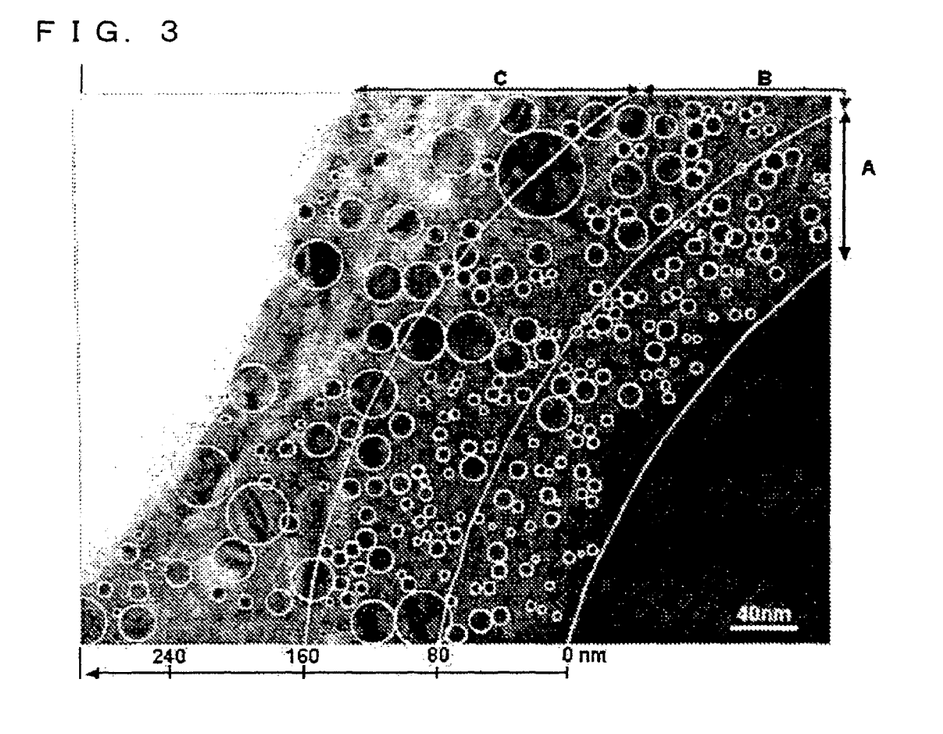
FIG. 3 is a processed image showing changes in magnetic material cluster size observed in the cross-sectional TEM image of FIG. 2.
Figure 4:
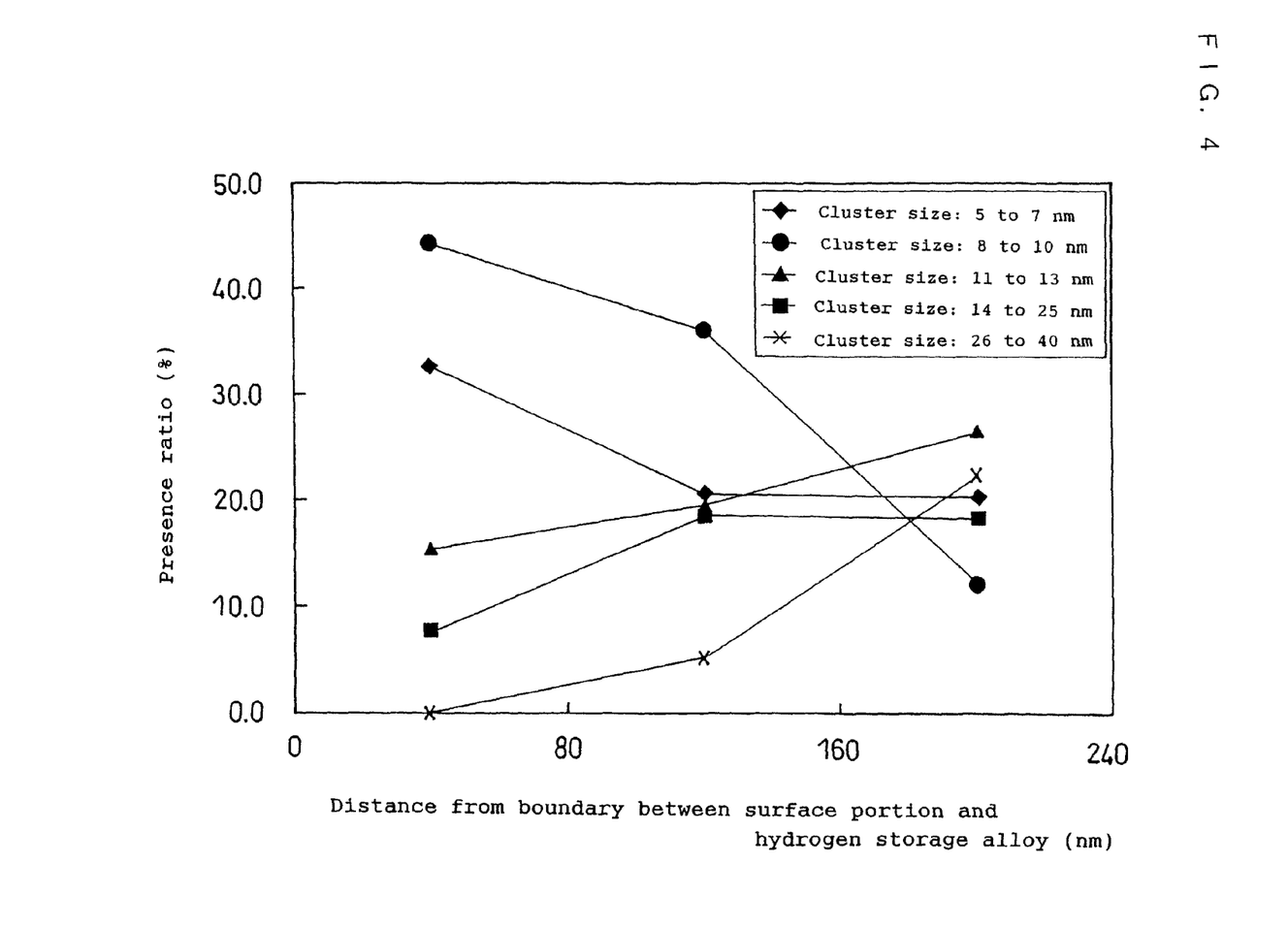
FIG. 4 is a graph showing a cluster size distribution for the magnetic material clusters in the thickness direction of a surface portion.

FIG. 3 shows the distribution of the corresponding circles. FIG. 4 shows the cluster size distribution of the magnetic material clusters in the thickness direction of the surface portion. The horizontal axis of FIG. 4 indicates the distance from the border (0 nm) between the hydrogen storage alloy and the surface portion to outside. In the horizontal axis, the range from 0 to 80 nm corresponds to the region A, the range from 80 to 160 nm corresponds to the region B, the range from 160 to 240 nm corresponds to the region C. The vertical axis indicates the presence ratio of the magnetic material clusters of each cluster size. The presence ratio of the magnetic material clusters of each cluster size in the regions A to C is plotted at 40 nm, 120 nm and 200 nm on the horizontal axis, respectively.

FIGS. 3 and 4 illustrate that the amount of the magnetic material clusters having a cluster size of 8 to 10 nm decreases monotonically from the inside toward the outside of the surface portion. The amount of the magnetic material clusters having a cluster size of 5 to 7 nm also decreases monotonically from the inside toward the outside of the surface portion, but the decreasing rate is not so significant. As for the magnetic material clusters having a cluster size of not less than 11 nm, the tendency of monotonic decrease was not observed.

Figure 5:
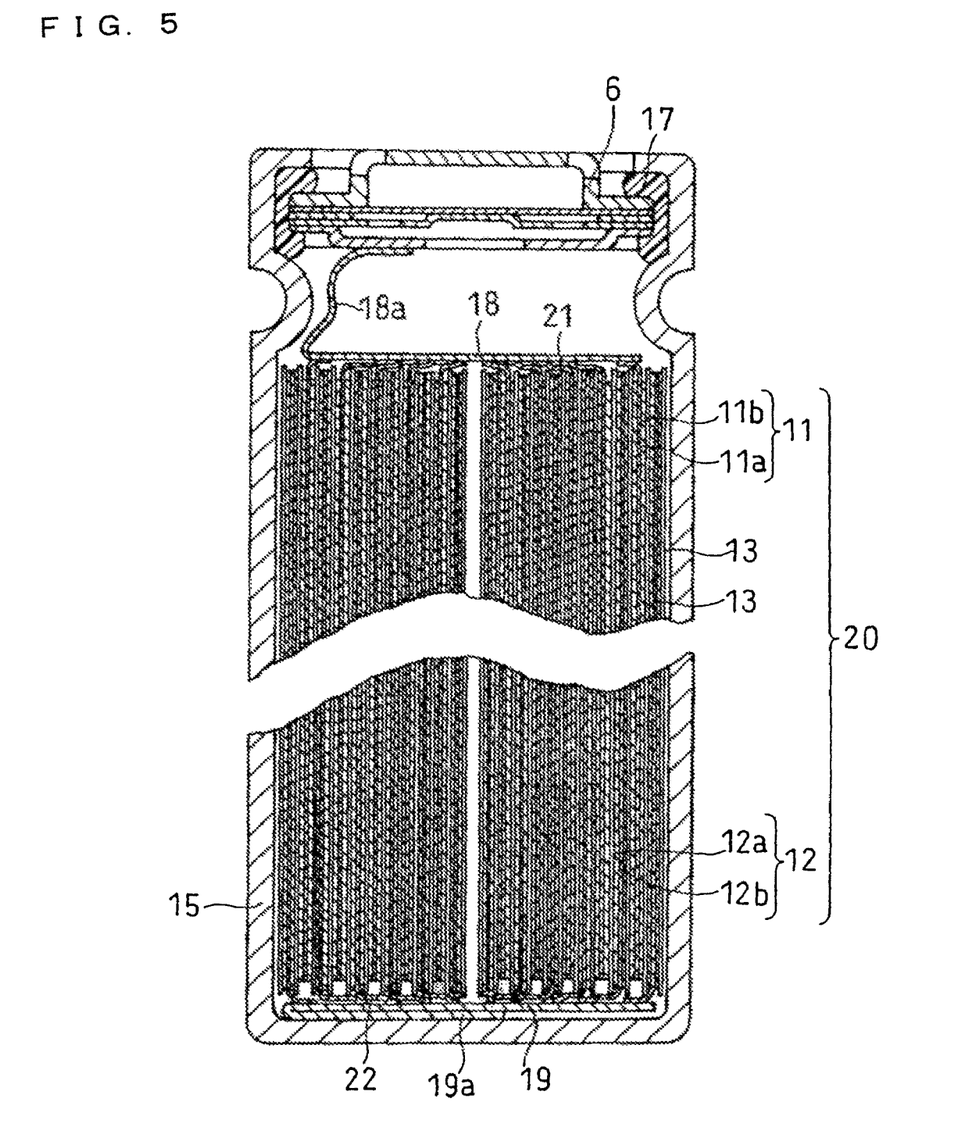
FIG. 5 is a vertical cross sectional view of a nickel-metal hydride storage battery according to an example.

Table 1 shows the temperature of aqueous solution of sodium hydroxide (T° C.), the value of A, the value of B, the value of A×B, the content of the magnetic material clusters in the electrode alloy powder, and the average cluster size of the magnetic material clusters.

metal hydride storage battery, as shown in FIG. 5, having a nominal capacity of 1500 mAh was produced. Specifically, the positive electrode 11 and the negative electrode 12 were spirally wound with a separator 13 interposed therebetween to produce a columnar electrode plate assembly 20. In the electrode plate assembly 20, the exposed portion of the positive electrode core material 11b carrying no positive electrode material mixture 11a and the exposed portion of the negative electrode core material 12b carrying no negative electrode material mixture 12a were exposed at opposite end faces of the electrode plate assembly 20. As the separator 13, a polypropylene non-woven fabric (thickness: 100 μm) was used. A positive electrode current collector plate 18 was welded to an end face 21 of the electrode plate assembly 20 at which the positive electrode core material 11b was exposed. A negative electrode current collector plate 19 was welded to an end face 22 of the electrode plate assembly 20 at which the

TABLE 1

| Ex. 1 | Conditions for activation step | | | | Evaluation of magnetic material clusters | | Evaluation of battery Capacity retention rate (%) |
|---|---|---|---|---|---|---|---|
| | A (wt %) | B (min.) | A × B value | Temperature of aqueous solution (° C.) | Content (wt %) | Average cluster size (nm) | |
| Comp. Ex. 1-1 | 25 | 35 | 875 | | 1.04 | 5.87 | 70 |
| Comp. Ex. 1-2 | 20 | 35 | 700 | 60 | 1.01 | 5.52 | 75 |
| Comp. Ex. 1-3 | 28 | 35 | 980 | 70 | 2.06 | 6.49 | 88 |
| Ex. 1-1 | 45 | 54 | 2430 | 110 | 2.95 | 9.73 | 97 |
| Ex. 1-2 | 43 | 59 | 2537 | 100 | 3.52 | 8.62 | 96 |
| Ex. 1-3 | 45.5 | 53 | 2411.5 | 100 | 3.57 | 9.20 | 93 |
| Ex. 1-4 | 44 | 55 | 2420 | 110 | 3.66 | 9.07 | 99 |
| Ex. 1-5 | 47 | 52 | 2440 | 100 | 3.92 | 8.95 | 97 |
| Ex. 1-6 | 42 | 58 | 2436 | 105 | 4.17 | 9.10 | 96 |
| Ex. 1-7 | 47 | 59 | 2773 | 100 | 4.00 | 8.80 | 97 |
| Comp. Ex. 1-4 | 40 | 100 | 4000 | 90 | 3.74 | 11.52 | 80 |
| Comp. Ex. 1-5 | 40 | 60 | 2400 | 115 | 4.52 | 12.20 | 76 |
| Comp. Ex. 1-6 | 49 | 130 | 6370 | 125 | 5.88 | 14.73 | 65 |
| Comp. Ex. 1-7 | 41 | 70 | 2870 | 115 | 5.13 | 13.22 | 70 |

(viii) Production of Hydrogen Storage Alloy Electrode

To 100 parts by weight of an electrode alloy powder, 0.15 parts by weight of carboxy methyl cellulose (etherification degree: 0.7, polymerization degree: 1600), 0.3 parts by weight of carbon black, and 0.7 parts by weight of styrene butadiene copolymer were added, and water was further added, which were then kneaded to obtain a paste. This paste was applied onto both surfaces of a core material made of a punched iron sheet (thickness: 60 μm, pore size: 1 mm, porosity: 42%) plated with nickel. The coated film of the paste was dried, and the coated film with the core material was then pressed with rollers. Thus, a hydrogen storage alloy electrode (negative electrode) having a thickness of 0.4 mm, a width of 35 mm, and a capacity of 2200 mAh was obtained. An exposed portion of the core material was formed on an end portion along the longitudinal direction of the negative electrode.

(ix) Production of Nickel-Metal Hydride Storage Battery

Using a sintered type nickel positive electrode having a capacity of 1500 mAh in which an exposed portion of a core material having a width of 35 mm was formed on an end portion along the longitudinal direction, a 4/5 A size nickel-negative electrode core material 12b was exposed. A sealing plate 6 and the positive electrode current collector plate 18 were electrically connected to each other with a positive electrode lead 18a interposed therebetween. Thereafter, the electrode plate assembly 20 was housed in a battery case 15 formed of a cylindrical bottomed can such that the negative electrode current collector plate 19 was placed on the bottom. A negative electrode lead 19a connected to the negative electrode current collector plate 19 was welded to the bottom of the battery case 15. After an electrolyte was injected into the battery case 15, the opening of the battery case 15 was sealed with the sealing plate 6 equipped with a gasket 17 therearound. Thus, a battery was produced. Electrolyte prepared by dissolving lithium hydroxide in an aqueous solution of potassium hydroxide having a specific gravity of 1.3 at a lithium hydroxide concentration of 40 g/L was used.

(x) Evaluation of Battery

The obtained nickel-metal hydride storage battery was evaluated for its cycle life using the capacity retention rate. Specifically, the battery was subjected to repeated cycles, in each of which the battery was charged at a 10-hour rate (150 mA) in an environment of 25° C. for 15 hours, and discharged at a 5-hour rate (300 mA) until the battery voltage reached 1.0 V. Then, the ratio of the discharge capacity obtained at the 200th cycle to the discharge capacity obtained at the second cycle was determined as a percentage, which was denoted as a capacity retention rate. The result is shown in Table 1.

Table 1 illustrates the following.

<i> When the magnetic material clusters have an average cluster size ranging from 8 to 10 nm, an excellent capacity retention rate is obtained, but when the average cluster size falls outside this range, the capacity retention rate decreases sharply.

<ii> When the content of the magnetic material clusters falls within a range from 2.8 to 4.2 wt %, magnetic material clusters having a preferred average cluster size are likely to be obtained. However, even when the content of the magnetic material clusters is 3 to 4.2 wt %, if the average cluster size of the magnetic material clusters falls outside the range from 8 to 10 nm, the capacity retention rate decreases sharply.

<iii> In order to obtain magnetic material clusters having a preferred average cluster size, it is effective to control the value of A×B to fall within the range from 2410 to 2800. Also, it is extremely effective to control the value of A to fall within the range from 42 to 47, and the value B to fall within the range from 52 to 59.

Example 2

Electrode alloy powders were obtained in the same manner as in Example 1-4, except that the composition of the hydrogen storage alloy was changed as shown in <a> to <e> below. In other words, the conditions for the activation step were set as follows: A=44, B=55, and A×B=2420.

<a> $La_{0.8}Nb_{0.2}Ni_{2.5}Co_{2.4}Al_{0.1}$
<b> $La_{0.8}Nb_{0.2}Zr_{0.03}Ni_{3.8}Co_{0.7}Al_{0.5}$
<c> $MmNi_{3.65}Co_{0.75}Mn_{0.4}Al_{0.3}$
<d> $MmNi_{2.5}Co_{0.7}Al_{0.8}$
<e> $Mm_{0.85}Zr_{0.15}Ni_{1.0}Al_{0.8}V_{0.2}$

Subsequently, nickel-metal hydride storage batteries were produced in the same manner as in Example 1 using the obtained electrode alloy powders. The obtained batteries were evaluated in the same manner. The results are shown in Table 2.

Example 3

A raw material powder having an average particle size of 20 μm was obtained by following the same procedure as in Example 1, except that, in the preparation of the hydrogen storage alloy, crude particles of the alloy were pulverized using a dry type ball mill. An electrode alloy powder was obtained by following the same procedure as in Example 1-4, except that the obtained raw material powder was used. In other words, the conditions for the activation step were set as follows: A=44, B=55, and A×B=2420.

Subsequently, a nickel-metal hydride storage battery was produced in the same manner as in Example 1 using the obtained electrode alloy powder. The obtained battery was evaluated in the same manner. The result is shown below.

Content of magnetic material clusters: 3.56 wt %
Average cluster size of magnetic material clusters: 8.48 nm
Capacity retention rate of battery: 98%

The above result indicates that the effect of the present invention is not limited by the method of pulverizing the hydrogen storage alloy.

Example 4

An electrode alloy powder was obtained by following the same procedure as in Example 1-4, except that the washing of the alloy performed after the activation step was terminated when the pH of the used warm water reached 11. In other words, the conditions for the activation step were set as follows: A=44, B=55, and A×B=2420.

Subsequently, a nickel-metal hydride storage battery was produced in the same manner as in Example 1 using the obtained electrode alloy powder. The obtained battery was evaluated in the same manner. The result is shown below.

Content of magnetic material clusters: 3.66 wt %
Average cluster size of magnetic material clusters: 8.40 nm
Capacity retention rate of battery: 86%

The above result indicates that, when the washing is terminated when the pH is still high, a hydrate or oxide of rare-earth elements is likely to remain on the surface of the alloy. The reason that the capacity retention rate was low as compared to that of the other examples is presumably because the remaining hydrate or oxide leached out into the electrolyte during the repetition of charge and discharge.

TABLE 2

| | Conditions for activation step | | | | Evaluation of magnetic material clusters | | Evaluation of battery |
| --- | --- | --- | --- | --- | --- | --- | --- |
| Ex. 2 | A (wt %) | B (min.) | A × B value | Temperature of aqueous solution (° C.) | Content (wt %) | Average cluster size (nm) | Capacity retention rate (%) |
| Alloy a | 44 | 55 | 2420 | 110 | 3.05 | 9.05 | 97 |
| Alloy b | 44 | 55 | 2420 | 110 | 3.62 | 9.43 | 99 |
| Alloy c | 44 | 55 | 2420 | 110 | 3.21 | 8.80 | 98 |
| Alloy d | 44 | 55 | 2420 | 110 | 3.90 | 9.56 | 99 |
| Alloy e | 44 | 55 | 2420 | 110 | 3.41 | 8.51 | 97 |

As shown in Table 2, even when various hydrogen storage alloys are used, as long as the magnetic material clusters has an average cluster size of 8 to 10 nm, excellent capacity retention rate is similarly obtained.

INDUSTRIAL APPLICABILITY

The present invention provides an electrode alloy powder suitable for, for example, a hydrogen storage alloy electrode for alkaline storage batteries. The present invention is useful particularly in the field of alkaline storage batteries, which require an excellent cycle life. The present invention can be used in the field of, for example, power sources for compact portable devices, power sources for hybrid automobiles, and the like.

The invention claimed is:

1. An electrode alloy powder comprising a hydrogen storage alloy and magnetic material clusters,
   wherein said hydrogen storage alloy comprises 20 to 70 wt % of Ni,
   said magnetic material clusters comprise metal nickel, said magnetic material clusters have an average cluster size of 8 to 10 nm,
   said magnetic material clusters are deposited in a surface portion of said powder, and
   the cluster size of said magnetic material clusters increases gradually from the inside toward the outside of said surface portion.

2. The electrode alloy powder in accordance with claim 1, wherein the amount of said magnetic material clusters having a cluster size of 8 to 10 nm decreases gradually from the inside toward the outside of said surface portion.

3. The electrode alloy powder in accordance with claim 1, wherein the content of said magnetic material clusters is 2.8 to 4.2 wt %.

4. The electrode alloy powder in accordance with claim 1, wherein said hydrogen storage alloy has a CaCu type crystal structure.

5. The electrode alloy powder in accordance with claim 4, wherein said hydrogen storage alloy further comprises: Co; Mn; Al; and a mixture of rare-earth metal elements.

6. The electrode alloy powder in accordance with claim 5, wherein the Co content in said hydrogen storage alloy is 6 wt % or less.

7. An alkaline storage battery comprising a negative electrode including the electrode alloy powder in accordance with claim 1.

* * * * *